United States Patent
Kanar et al.

(10) Patent No.: US 10,720,985 B1
(45) Date of Patent: Jul. 21, 2020

(54) BEAM FORMING MODULE IMPLEMENTATION FOR HIGH ISOLATION AND LOW NOISE FIGURE SYSTEMS

(71) Applicant: Integrated Device Technology, Inc., San Jose, CA (US)

(72) Inventors: Tumay Kanar, San Diego, CA (US); Chih-Hsiang Ko, San Diego, CA (US)

(73) Assignee: Integrated Device Technology, Inc., San Jose, CA (US)

(*) Notice: Subject to any disclaimer, the term of this patent is extended or adjusted under 35 U.S.C. 154(b) by 0 days.

(21) Appl. No.: 16/354,791

(22) Filed: Mar. 15, 2019

(51) Int. Cl.
*H04W 4/00* (2018.01)
*H04B 7/185* (2006.01)
*H04W 16/28* (2009.01)
*H04B 7/10* (2017.01)
*H04B 7/06* (2006.01)

(52) U.S. Cl.
CPC ........... *H04B 7/185* (2013.01); *H04B 7/0617* (2013.01); *H04B 7/10* (2013.01); *H04W 16/28* (2013.01)

(58) Field of Classification Search
CPC ........ H04B 7/185; H04B 7/0617; H04B 7/10; H04W 16/28
USPC .......................................... 455/427; 370/338
See application file for complete search history.

(56) References Cited

U.S. PATENT DOCUMENTS

2003/0189515 A1* 10/2003 Jacomb-Hood ........ H01Q 1/288
342/373
2010/0060537 A1* 3/2010 Nagayama ............. H01Q 1/247
343/776
2019/0253899 A1* 8/2019 Shi ........................ H04W 48/16

* cited by examiner

*Primary Examiner* — Marcos Batista
(74) *Attorney, Agent, or Firm* — Christopher P. Maiorana, PC

(57) ABSTRACT

An apparatus comprises a phased array antenna panel, a plurality of amplifier circuits, and a plurality of beamformer circuits. The phased array antenna panel generally comprises a plurality of antenna elements. Each of the amplifier circuits is mounted on the phased array antenna panel adjacent to a respective one of the plurality of antenna elements and each of the amplifier circuits has one or more first ports directly coupled to the respective antenna element. Each of the beamformer circuits is mounted on the phased array antenna panel adjacent to a number of the amplifier circuits. Each of the beamformer circuits has one or more second ports directly coupled to each of the adjacent amplifier circuits. Each of the beamformer circuits is generally configured to exchange a plurality of radio-frequency signals with each of the adjacent amplifier circuits via the second ports.

20 Claims, 12 Drawing Sheets

BEAM FORMING MODULE IMPLEMENTATION FOR HIGH ISOLATION AND LOW NOISE FIGURE SYSTEMS

FIELD OF THE INVENTION

The invention relates to satellite communication generally and, more particularly, to a method and/or apparatus for implementing a beam forming module for high-isolation and low noise figure systems.

BACKGROUND

Phased array antenna panels are used to generate steerable beams that may be utilized in wireless and satellite communication systems. Phased arrays create a focused beam that can be steered very quickly to maintain a link for any on-the-move communication system. Conventional wireless communications systems can also utilize steerable beams to communicate with multiple wireless nodes by moving the beams from one wireless node to the next. A single beam may service multiple wireless nodes in a sequence and repeat the sequence periodically such that each wireless node appears to be in constant communications with the system.

Beam forming (or steering) is generally implemented utilizing low noise amplifiers (LNAs), power amplifiers (PAs), phase shifters, and/or other components in transceiver circuitry. The amplifiers utilized for beam forming either drive or are driven by respective antenna elements of the phased array antenna to produce and steer the beams. Existing implementations for beamformer-like circuits combine low noise amplifiers (LNAs) and/or power amplifiers (PAs) into a single chip solution. In single chip implementations, performance characteristics such as Noise Figure (NF) of a receive (RX) chain and/or output power of a transmit (TX) chain are degraded due to loss from the feeding network between the beamformer chip and the antenna elements. Single chip embodiments are also more susceptible to input-to-output coupling and external signal jams.

It would be desirable to implement a beam forming module for high-isolation and low noise figure systems.

SUMMARY

The invention concerns an apparatus comprising a phased array antenna panel, a plurality of amplifier circuits, and a plurality of beamformer circuits. The phased array antenna panel generally comprises a plurality of antenna elements. Each of the amplifier circuits is mounted on the phased array antenna panel adjacent to a respective one of the plurality of antenna elements and each of the amplifier circuits has one or more first ports directly coupled to the respective antenna element. Each of the beamformer circuits is mounted on the phased array antenna panel adjacent to a number of the amplifier circuits. Each of the beamformer circuits has one or more second ports directly coupled to each of the adjacent amplifier circuits. Each of the beamformer circuits is generally configured to exchange a plurality of radio-frequency signals with each of the adjacent amplifier circuits via the second ports.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a module implementation for high-isolation and low noise figure systems that may (i) implement LNAs (or PAs) separately from beamformer circuits, (ii) implement improve noise figure or power loss, (iii) reduce amount of gain needed in beamformer circuits, (iv) reduce gain and/or phase error due to input-to-output coupling, (v) implement external high-Q filters between LNAs(PAs) and beamformer circuits to reject unwanted signals, (vi) place LNAs(PAs) on top of antenna elements to minimize loss, (vii) implement filters on printed circuit board or with surface mount devices (SMDs), (viii) provide higher isolation between beamformer RF input/output port and LNA inputs, (ix) be utilized in E, Ku, Ka, 5G mmW, and/or CDL frequency band applications, (x) be applied in both single-beam and dual-beams applications, and/or (xi) be implemented as one or more integrated circuits or multi-chip-module (MCM).

Figure 1:
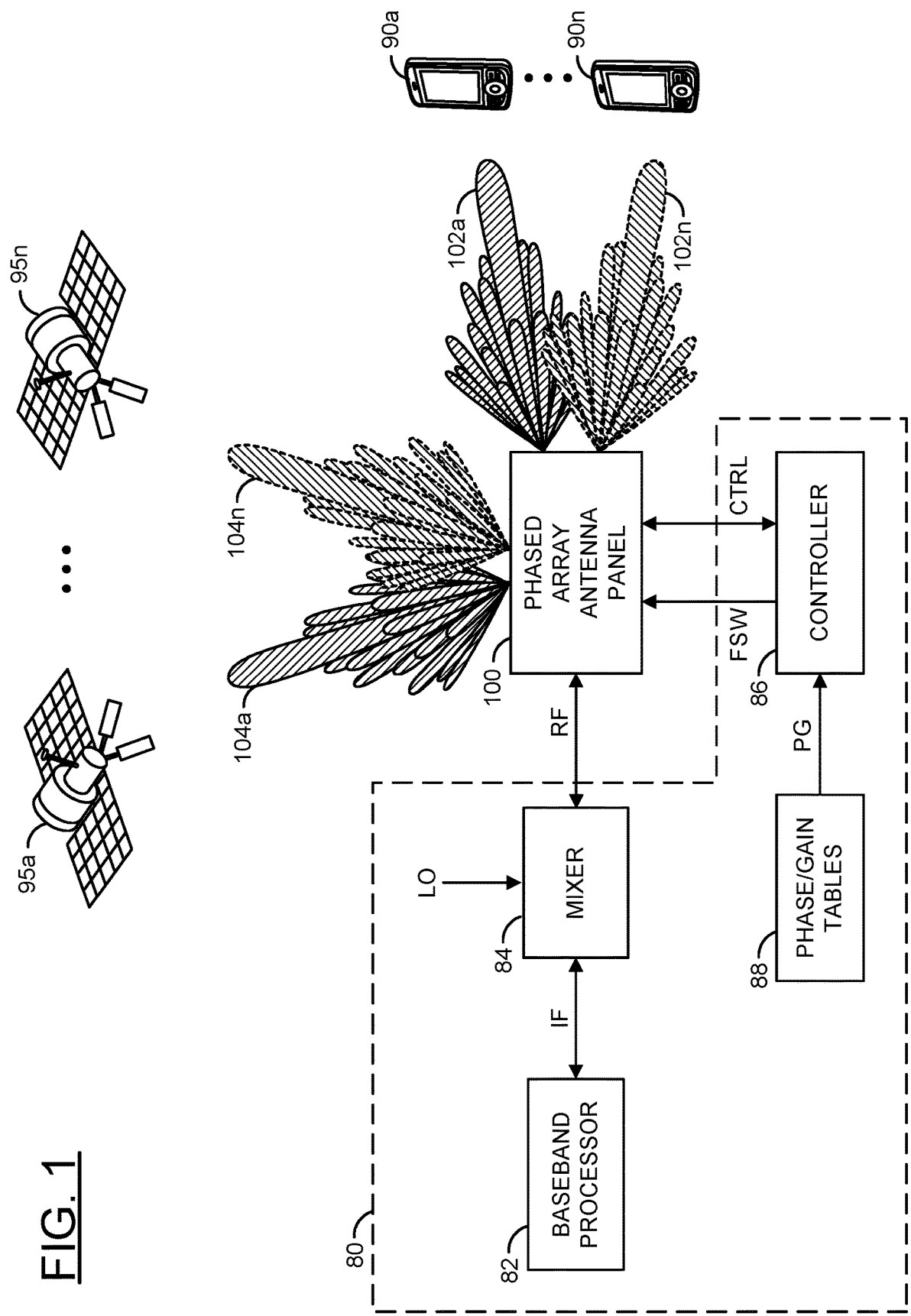
FIG. 1 is a diagram of a system illustrating an example context of the invention.

Referring to FIG. 1, a block diagram of a system 80 is shown illustrating an example context of the invention. The system (or module or circuit or apparatus) 80 may implement a radio-frequency (RF) transceiver system in accordance with an example embodiment of the invention. The RF transceiver system 80 may be configured to operate at common wireless radio frequencies, microwave frequencies, and/or millimeter-wave frequencies. In an example, the RF transceiver system 80 may be configured to facilitate communication with and/or between a plurality of communications devices (or terminals) 90a-90n and/or a plurality of satellites 95a-95n. In an example, the communications devices 90a-90n may include, but are not limited to, cellular telephones, mobile devices, tablets, internet-of-things (IoT) equipment, base stations, etc. In an example, the satellites 95a-95n may include, but are not limited to, low earth orbit (LEO) satellites, geo-stationary earth orbiting (GEO) satellites, etc. In various embodiments, the RF transceiver system 80, the communications devices 90a-90n, and/or the satellites 95a-95n may be coupled using at least one phased array antenna panel 100 in accordance with an example embodiment of the invention.

In an example, the RF transceiver system 80 may form part of a communications link. In some embodiments, the communications link may be part of a fifth generation (5G) wireless communications system (e.g., for which a standard is currently under development by the Next Generation Mobile Networks (NGMN) Alliance). In some embodiments, the communications link may be part of a 5G millimeter wave (mmW) wireless communications system. In an example, an embodiment of the invention may be part of 28 GHz and/or 39 GHz 5G mmW applications. In other embodiments, the communications link may be part of systems including, but not limited to, a fourth generation (4G) wireless communications system (e.g., International Mobile Telecommunications-Advanced (IMT-A) standard published by the International Telecommunications Unit Radiocommunication Sector (ITU-R)), a satellite communication (SATCOM) system, and point-to-point communications systems such as common data link (CDL), E-band, backhaul, etc. However, other communications standards may be implemented to meet the design criteria of a particular application.

In an example, the RF transceiver system 80 may comprise a block (or circuit) 82, a block (or circuit) 84, a block (or circuit) 86, and a block (or circuit) 88. In various embodiments, the blocks 82-88 may be implemented with hardware, a combination of hardware and software, and/or simulated with software. A signal (e.g., IF) may be exchanged between the circuit 82 and the circuit 84. The signal IF may implement an intermediate-frequency signal. In an example, the signal IF may be configured (e.g., using various modulation schemes) to carry information to be transmitted from and/or received by the RF transceiver system 80. In an example, a signal (e.g., LO) may be presented to the circuit 84. The signal LO may implement a local oscillator signal. A signal (e.g., RF) may be exchanged between the circuit 84 and the phased array antenna panel 100. The signal RF may be a radio-frequency, millimeter-wave frequency, or microwave frequency signal that conveys the information also found in the intermediate-frequency signal IF. The signal RF may comprise one or more beams.

In a transmit mode, the radio-frequency signal RF may convey information to be broadcast from the phased array antenna panel 100 to the devices 90a-90n and/or the satellites 95a-95n. In a receive mode, the radio-frequency signal RF may convey information received from the devices 90a-90n and/or the satellites 95a-95n via the phased array antenna panel 100. A signal (e.g., FSW) and a signal or signals (e.g., CTRL) may be exchanged between the circuit 86 and the phased array antenna panel 100. The signal FSW may switch the phased array antenna panel 100 between the transmit mode and the receive mode. The signal(s) CTRL may convey data, clocking, and control elements. In an example, the signals FSW and CTRL may be part of a digital interface of the phased array antenna panel 100. In an example, the signal(s) CTRL may be implemented as a serial link that conveys information for configuring and/or determining phase and/or gain settings for antenna elements of the phased array antenna panel 100. In an example, the signal(s) CTRL may be compliant with one or more serial communication protocols or interfaces (e.g., serial peripheral interface (SPI), inter-integrated circuit communications ($I^2C$), daisy chain, etc.). A signal or signals (e.g., PG) may be transferred from the circuit 88 to the circuit 86. In an example, the signal(s) PG may convey phase information and gain information used by the circuit 86 to implement (control) beam steering using the phased array antenna panel 100. In an example, the signal(s) PG may convey a plurality of phase and gain values that may be programmed into a plurality of beam former circuits of the phased array antenna panel 100 via the signal(s) CTRL.

The phased array antenna panel 100 generally implements a hard-wired address scheme. The hard-wired address scheme may be used to uniquely identify serial communications intended for elements (e.g., the beam former circuits) of the phased array antenna panel 100. In various embodiments, multiple phased array antenna panels 100 may be combined to form a larger antenna array that may provide more transmission channels. The multiple phased array antenna panels may share a serial communication channel, link, or bus. Each of the phased array antenna panels 100 making up the larger antenna array may be uniquely addressed using respective hard-wired addresses.

The phased array antenna panel 100 may generate one or more fields (or beams) 102a-102n and/or 104a-104n. The fields 102a-102n and/or 104a-104n may represent a field pattern (or radio-frequency beam pattern) created by the beam former circuits of the phased array antenna panel 100 based upon the phase and gain information (values) received via the signal(s) CTRL. The phased array antenna panel 100 may be configured to produce directional beams 102a-102n and/or 104a-104n for communication with the communication devices 90a-90n and/or the satellites 95a-95n. In an example, the phased array antenna panel 100 may be controlled to steer the beams 102a-102n and/or 104a-104n, based on the phase and gain information received via the signal (s) CTRL, to track movement of the communication devices 90a-90n and/or the satellites 95a-95n and/or switch between the communication devices 90a-90n and/or the satellites 95a-95n.

The circuit 82 may implement a baseband processor circuit. The circuit 82 may be operational to process the information sent by and/or received in the intermediate-frequency signal IF. The circuit 82 may process the information within the RF transceiver system 80. The processing may include, but is not limited to, modulation/demodulation of the signal that contains the information and management of simultaneous communications between the RF transceiver system 80 and the multiple remote terminals 90a-90n.

The circuit 84 may implement one or more mixer circuits. The circuit 84 is generally operational to frequency convert (e.g., up-convert, down-convert, etc.) between an intermediate frequency used for the signal IF and the radio frequency, millimeter-wave frequency, or microwave frequency used for the signal RF. The frequency conversion may be based on one or more local oscillator frequencies provided by the signal LO. In various embodiments, the radio-frequency signal RF may be in a range of frequencies approximately centered around a center frequency of either 28 gigahertz (GHz) or 39 GHz (e.g., 24 GHz to 30 GHz or 37 GHz to 44 GHz). In embodiments implementing multiple intermediate frequencies, each intermediate frequency may cover a band from approximately 2 GHz to about 6 GHz (e.g., an approximately 4 GHz bandwidth). In an example, each local oscillator frequency may range from approximately 22 GHz to 26 GHz when the signal RF is approximately centered at 28 GHz. In another example, each local oscillator frequency may range from approximately 33 GHz to 37 GHz when the signal RF is approximately centered at 39 GHz. However, other frequency ranges may be implemented to meet the design criteria of a particular application.

The circuit 86 may implement a control circuit. In various embodiments, the circuit 86 may be implemented using one or more of an application specific integrated circuit (ASIC), controller, microprocessor, or circuitry configured accordingly. The circuit 86 is generally operational to control the operations of the phased array antenna panel 100. In some embodiments, the circuit 86 may determine the setting values used in each transceiver channel within the beam former circuits of the phased array antenna panel 100. The setting values may establish the geometry of the field(s) or beam(s) 102a-102n and/or 104a-104n. In various embodiments, the circuit 86 may be implemented as one or more integrated circuits.

In an example, the circuit 88 may implement a table of values (e.g., embodied in a memory circuit). In an example, the table of values embodied in the circuit 88 may be configured to store multiple gain (G) values and multiple phase (P) values. The phase and gain values may be used by the transceiver channels in the phased array antenna panel 100 to establish the fields 102a-102b. The phase values and the gain values may be fetched from the circuit 88 via the signal PG and programmed into buffers associated with the beam former circuits of the phased array antenna panel 100 by the circuit 86. In various embodiments, the circuits 86 and 88 may be implemented either on the same integrated circuit or on different (separate) integrated circuits.

In an example, the phased array antenna panel 100 may be implemented comprising either single-polarization (or single-pole) antenna elements or dual-polarization (or dual-pole or di-pole) antenna elements. The phased array antenna panel 100 may be operational to transmit and receive wireless signals to and from the devices (or terminals) 90a-90n and/or the satellites 95a-95n. The devices (or terminals) 90a-90n and/or the satellites 95a-95n may be remotely located from the RF transceiver system 80. Sensitivity to the wireless and/or satellite signals may be determined by the fields 102a-102n and/or 104a-104n created by the phased array antenna panel 100. The phased array antenna panel 100 may comprise a plurality of antenna elements and a plurality of beam former circuits. Each beam former circuit may implement a plurality of channels. Each channel may comprise a transmit (TX) channel, a receive (RX) channel, or both transmit and receive (TRX) channels. The channels may be coupled to the antenna elements by corresponding radio-frequency signals. In embodiments implementing both transmit and receive channels, the channels may be coupled to the antenna elements by bidirectional radio-frequency signals. The channels and antenna elements generally form a two-dimensional antenna network. The channels are generally referred to herein as transceiver channels. The term transceiver channel is not intended to be limited to or require both transmit and receive capability, but instead is intended to encompass receive only, transmit only and transmit and receive capable channels.

Figure 2:
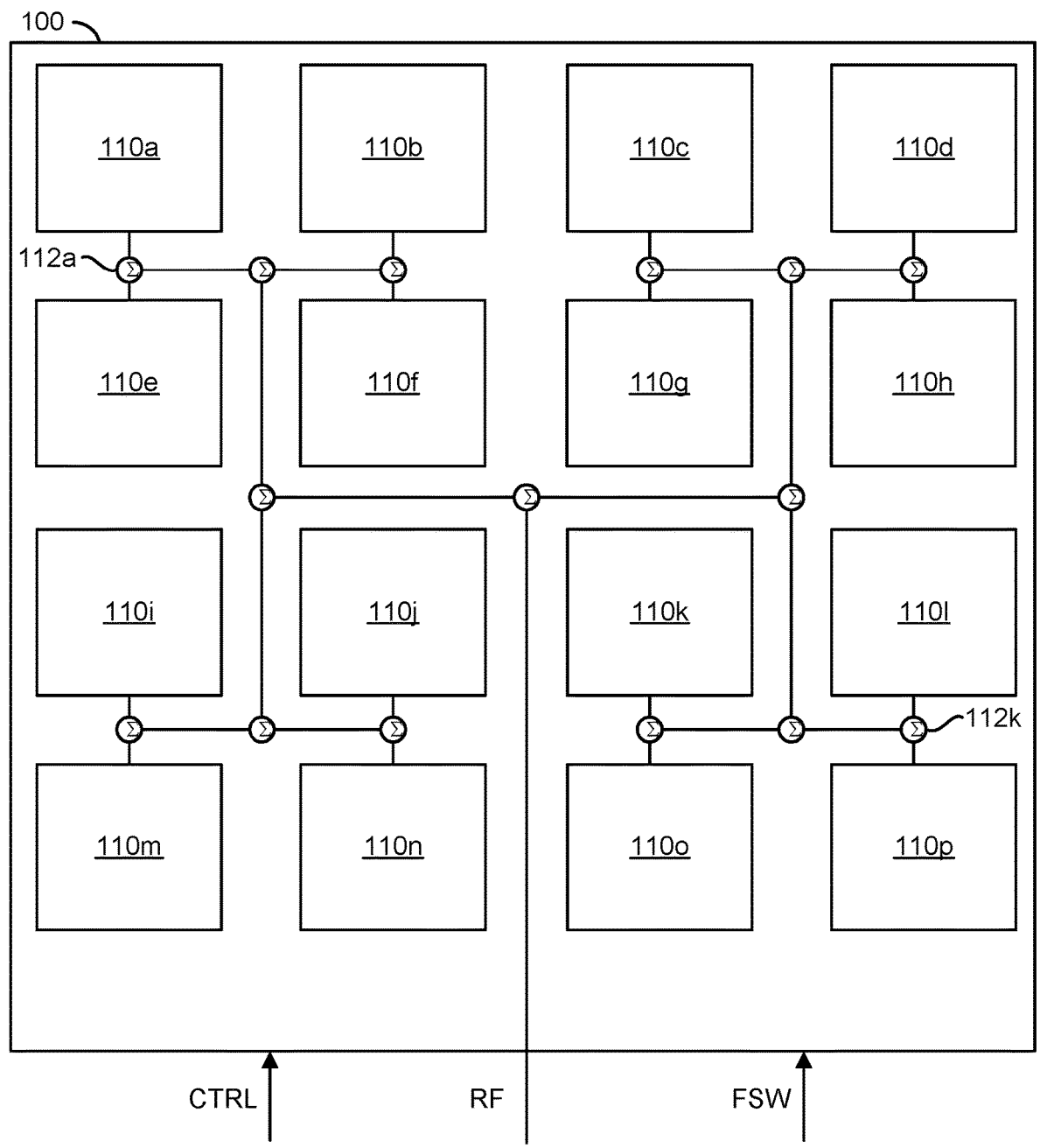
FIG. 2 is a diagram illustrating an example implementation of a dual-polarization single-beam phased array antenna panel in accordance with an example embodiment of the invention.

Referring to FIG. 2, a diagram is shown illustrating an example implementation of a single-beam version of the phased array antenna panel 100 in accordance with an embodiment of the invention. In an example, the phased array antenna panel 100 may comprise a number of blocks (or circuits) 110a-110p and a number of blocks (or circuits) 112a-112k. In various embodiments implementing a single-beam phased array antenna panel, the blocks 110a-110p generally represent circuits having dual polarization (or dual-pole) single-beam beam forming and/or steering capability (or simply beamforming capable circuits). Each of the circuits 112a-112k may implement a combiner/splitter circuit. The circuits 110a-110p and 112a-112k may be implemented with hardware, a combination of hardware and software, and/or simulated with software. In an example, the signal RF may be exchanged with one of the circuits 112a-112k and distributed by or combined by a remainder of the circuits 112a-112k. The signals FSW and CTRL may be exchanged with the circuits 110a-110p.

The circuits 110a-110p in the phased array antenna panel 100 may be used for transmission and/or reception. A physical positioning of the circuits 110a-110p generally provides for two-dimensional (e.g., horizontal and vertical) control of the fields 102a-102n and/or 104a-104n. In an example, the circuits 110a-110p may be arranged in a 2-dimensional (e.g., N×N) grid pattern, where N is an integer value divisible by 2. However, other dimensions of grid patterns may be implemented accordingly to meet design criteria of a particular implementation.

In various embodiments, each of the circuits 112a-112k may be implemented as a combiner/splitter circuit. In an example, the circuits 112a-112k may be implemented as radio frequency (RF) combiner/splitters (e.g., Wilkinson, etc.). In various embodiments, the circuits 112a-112k may be coupled together to form a network that couples the circuits 110a-110p to an input/output of the phased array antenna panel 100 configured to present/receive the signal RF. In the transmit mode, the circuits 112a-112k are generally operational to distribute the power in the signal RF among the circuits 110a-110p. In the receive mode, the circuits 112a-112k may be operational to combine the power received in signals from the circuits 110a-110p into the signal RF. The circuits 112a-112k are generally configured to provide a substantially equivalent path length between the RF input/output of the phased array antenna panel 100 and each of the circuits 110a-110p.

Figure 3:
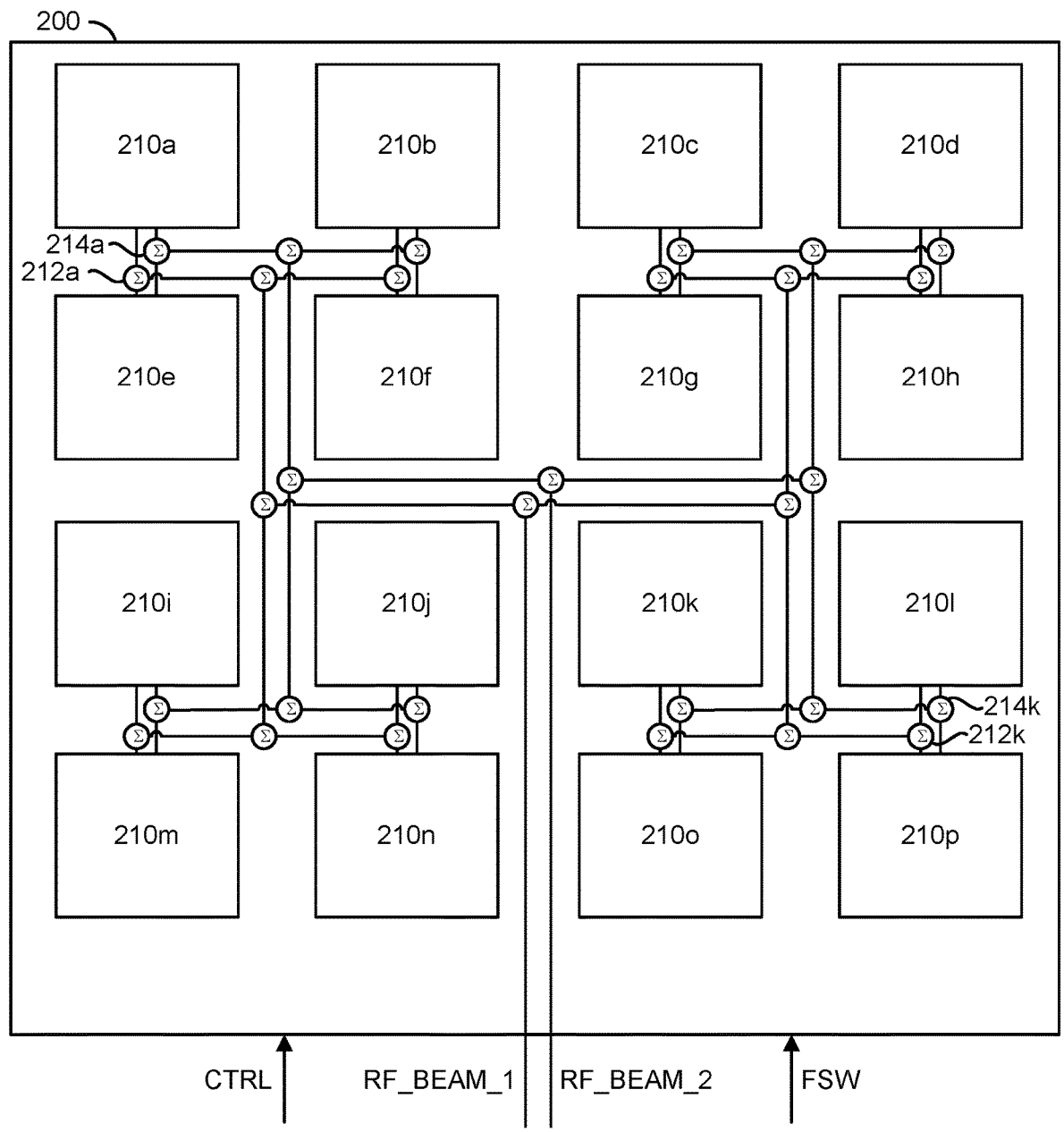
FIG. 3 is a diagram illustrating an example implementation of a dual-polarization dual-beam phased array antenna panel in accordance with an example embodiment of the invention.

Referring to FIG. 3, a diagram is shown illustrating an example implementation of a phased array antenna panel 200 in accordance with an embodiment of the invention. In an example, the phased array antenna panel 200 implements a dual-beam (or multi-beam) version of the phased array antenna panel 100. In an example, the phased array antenna panel 200 may comprise a number of blocks (or circuits) 210a-210p, a number of blocks (or circuits) 212a-212k, and a number of blocks (or circuits) 214a-214k. In various embodiments implementing a dual-polarization (or dual-pole) dual-beam (or multi-beam) phased array antenna panel, the blocks 210a-210p generally represent circuits having dual-polarization (or dual-pole) dual-beam beam forming and/or steering capability. Each of the circuits 212a-212k and 214a-214k may implement a combiner/splitter circuit. The circuits 210a-210p, 212a-212k, and 214a-214k may be implemented with hardware, a combination of hardware and software, and/or simulated with software.

In an example of a dual-beam embodiment, the beamforming capable circuits 210a-210p may be implemented having first and second RF beam input/output ports. The circuits 212a-212k may be coupled together to form a first network that couples the circuits 210a-210p to a first input/output port of the phased array antenna panel 200 configured to present/receive a first RF beam signal (e.g., RF_BEAM_1). The circuits 214a-214k may be coupled together to form a second network that couples the circuits 210a-210p to a second input/output port of the phased array antenna panel 200 configured to present/receive a second RF beam signal (e.g., RF_BEAM_2). In an example, the signals RF_BEAM_1 and RF_BEAM_2 may be exchanged with one of the circuits 212a-212k and 214a-214k, respectively, and distributed by or combined by a remainder of the circuits 212a-212k and 214a-214k, respectively. The signals FSW and CTRL may be exchanged with the circuits 210a-210p.

The beamforming capable circuits 210a-210p in the phased array antenna panel 200 may be used for transmission and/or reception. A physical positioning of the beamforming capable circuits 210a-210p generally provides for two-dimensional (e.g., horizontal and vertical) control of the fields 102a-102n and/or 104a-104n. In an example, the beamforming capable circuits 210a-210p may be arranged in a 2-dimensional (e.g., N×N) grid pattern, where N is an integer value divisible by 2. However, other dimensions of grid patterns may be implemented accordingly to meet design criteria of a particular implementation.

In an example, each of the circuits 210a-210p generally comprises a number of channels that are coupled to respective antenna elements. In an example, each of the circuits 210a-210p may be coupled to four adjacent antenna elements (e.g., arranged in a 2×2 grid). However, other numbers (e.g., 1, 2, 4, 18, etc.) of adjacent antenna elements may be implemented to meet design criteria of a particular implementation. In embodiments implementing channels with both receive and transmit capability, the circuits 210a-210p may be configured to switch between a transmit mode and a receive mode in response to the signal FSW. The circuits 210a-210p may be operational to rapidly change setting values (e.g., phase values, gain values, bias values, etc.) used by the channels in order to steer the beams (or fields) 102a-102n and/or 104a-104n of the phased array antenna panel 200. In various embodiments, each of the circuits 210a-210p may be implemented as a number of integrated circuits. The integrated circuits may be mounted to the panel separately or in a package or multi-chip module (MCM).

In various embodiments, each of the circuits 212a-212k and 214a-214k may be implemented as a combiner/splitter circuit. In an example, the circuits 212a-212k and 214a-214k may be implemented as RF combiner/splitters (e.g., Wilkinson, etc.). In various embodiments, the circuits 212a-212k and 214a-214k may be coupled together to form a network that couples the circuits 210a-210p to the input/output ports of the phased array antenna panel 200 configured to present/receive the signals RF_BEAM_1 and RF_BEAM_2. In the transmit mode, the circuits 212a-212k and 214a-214k are generally operational to distribute the power in the signals RF_BEAM_1 and RF_BEAM_2 among the circuits 210a-210p. In the receive mode, the circuits 212a-212k and 214a-214k may be operational to combine the power received in signals from the circuits 210a-210p into the signals RF_BEAM_1 and RF_BEAM_2. The circuits 210a-210p, 212a-212k, and 214a-214k are generally configured to provide a substantially equivalent path length between the RF input/output ports of the phased array antenna panel 200 and each of the circuits 210a-210p. Although the invention has been described using dual-polarization examples, embodiments of the invention may also be applied in single polarization phased array antenna panel applications.

Figure 4:
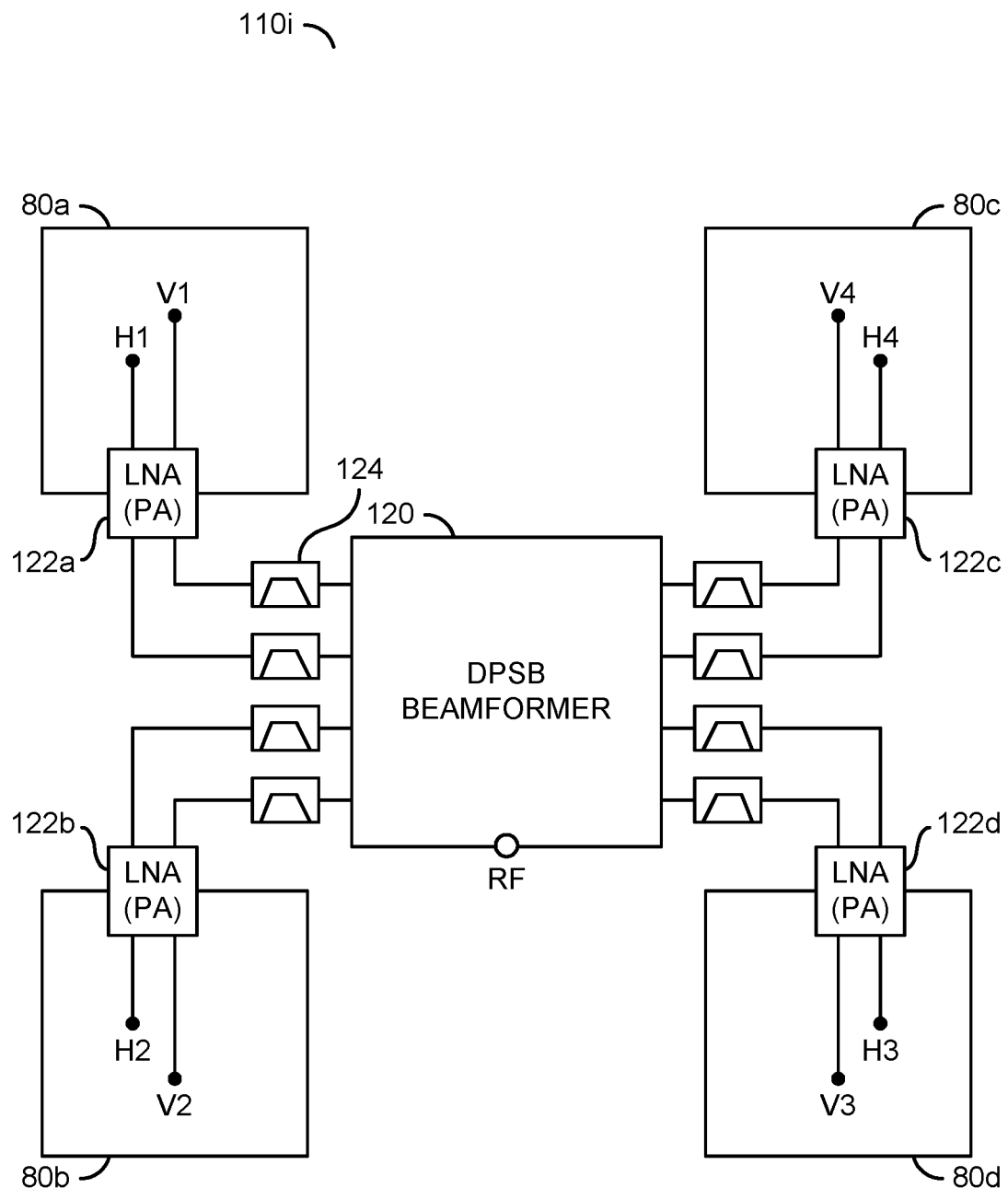
FIG. 4 is a diagram illustrating a beamformer circuit of a dual-polarization single-beam phased array antenna panel in accordance with an example embodiment of the invention.

Referring to FIG. 4, a diagram is shown illustrating an example layout of a beamforming capable circuit 110i in accordance with an example embodiment of the invention. The circuit 110i may be representative of the circuits 110a-110p of FIG. 2. In an example, the beamforming capable circuit 110i may comprise a dual polarization single-beam (DPSB) beamformer circuit 120, a number of amplifiers 122a-122d, and a number of neighboring antenna elements 80a-80d arranged in accordance with an embodiment of the invention. The layout of the beamforming capable circuit 110i may be representative of the layout of the beamforming capable circuits 110a-110p. The dual polarization single-beam (DPSB) beamformer circuit 120 is generally implemented as a packaged integrated circuit. The amplifiers 122a-122d are generally implemented as separately packaged amplifier circuits. In various embodiments, the amplifiers 122c-122d comprise low noise amplifiers (LNAs) in receiver applications and power amplifiers (PAs) in transmitter applications. The amplifiers 122a-122d are generally implemented as separate integrated circuits from the DPSB beamformer circuit 120. The set of four antenna elements 80a-80d may be representative of a subset of antenna elements 80a-80n of the phased array antenna panel 100.

In an example, the antenna elements 80a-80n may be spaced apart from each other in both a horizontal direction and a vertical direction. In an example, the antenna elements may be separated by less than a half-wavelength (e.g., less than 5 millimeters (mm)). However, other spacings (e.g., 7 mm, ~13 mm, etc.) may be implemented accordingly to meet design criteria of a particular application. In various embodiments for a dual-polarization implementation, the packaged beamformer circuit 120 may have dimensions (e.g., 3.3 mm by 4.8 mm, etc.) allowing placement within the space between the adjacent antenna elements 80a-80d. Each beamforming capable circuit 110a-110p (e.g., 110i shown) may comprise a beamformer chip (or integrated circuit or module) 120 mounted on a substrate of the phased array antenna panel 100, at a center of a number of neighboring antenna elements 80a-80n (e.g., 80a-80d shown), and a number of separate (external) amplifier chips (or integrated circuit or module) (e.g., 122a-122d shown) mounted in close proximity to respective antenna elements 80a-80n.

Placing the amplifiers in a position overlapping or on top of the antenna elements allows for minimal loss between antenna feeds and the amplifiers, and also allows for an optional high-pass/band-pass filter (or filters) 124 to be placed between each of the amplifiers 122a-122d and the beamformer chip 120. In an example, the filters 124 may be implemented on printed circuit boards (PCBs) or with surface mount devices (SMDs). The placement of the separate external amplifiers 122a-122d on top of the antenna elements 80a-80d generally provides higher isolation between the common RF input/output port RFC and the amplifier input/outputs of the beamformer circuit 120. The higher isolation generally results in lower root mean square (rms) gain and phase error, and lower system noise. The arrangement may be more desirable for lower frequency applications (e.g., Ku and CDL frequency bands).

Traces in a single conductive (e.g., metal) layer of the substrate may spatially route signals into alignment between the beamformer circuit 120, the amplifier circuits 122a-122d, and the antenna elements 80a-80d. For example, the single conductive layer may be the layer adjoining input/output pads of the beamformer circuit 120. The traces may remain in the single conductive layer until aligned with the input/output pads of the antenna elements 80a-80d. Through-substrate vias may provide connections from the traces to the antenna elements 80a-80d.

In some embodiments, each antenna element 80a-80n of the phased array antenna panel 100 may be connected to a corresponding amplifier circuit 122a-122d with two traces/through-substrate vias. In an example, the amplifier circuits 122a-122d may be mounted on a first surface (or side) of the phased array antenna panel 100 and the antenna elements 80a-80n may be located on a second surface (or side) or within a layer of the phased array antenna panel 100. The two traces/through-substrate vias may couple signals between the amplifier circuits 122a-122d and the antenna elements 80a-80n through intervening layers of the phased array antenna panel 100. One of the two traces/vias may convey a horizontally-polarized signal (e.g., H1-H4 shown). Another trace/via may convey a vertically-polarized signal (e.g., V1-V4 shown). Traces in the single conductive layer of the substrate may also directly connect the amplifiers 122a-122d to the beamformer circuit 120 and the beamformer circuit 120 to the combiner circuits 112a-112k (see FIG. 2). In various embodiments, each beamformer circuit 120 may be directly connected by a trace to a corresponding one of the combiner circuits 112a-112k. For example, a trace may carry the signal (e.g., RF). In various embodiments, a compact package may be implemented that enables the beamformer integrated circuits 120 to fit into the array grid with minimum length antenna element interconnects. The compact layout generally allows higher power efficiency by minimizing RF losses. The overall loss optimization generally provides better thermal performance.

Implementing the VH-HV configuration generally minimizes the loss and possible crossovers. Having lower loss in the antenna interface may improve a receive gain and/or a transmit gain. The lower loss may improve a total gain budget multiple (e.g., 2) times, once on the receiving side and once on the transmitting side in configurations where two of the panels are used in a transmit-receive communication system. The lower loss may provide flexibility for the beamformer circuits 120 to utilize a lower output power that is saved from the connection. The lower output power generally means lower power consumption and better thermal consumption. Up to a few (e.g., 1-2) decibels improvement may result in a modest (e.g., 20-30%) power consumption improvement and a relative thermal performance improvement. The same may apply for the receive mode and lower power consumption to achieve relaxed 5G New Radio specification criteria.

Figure 5:
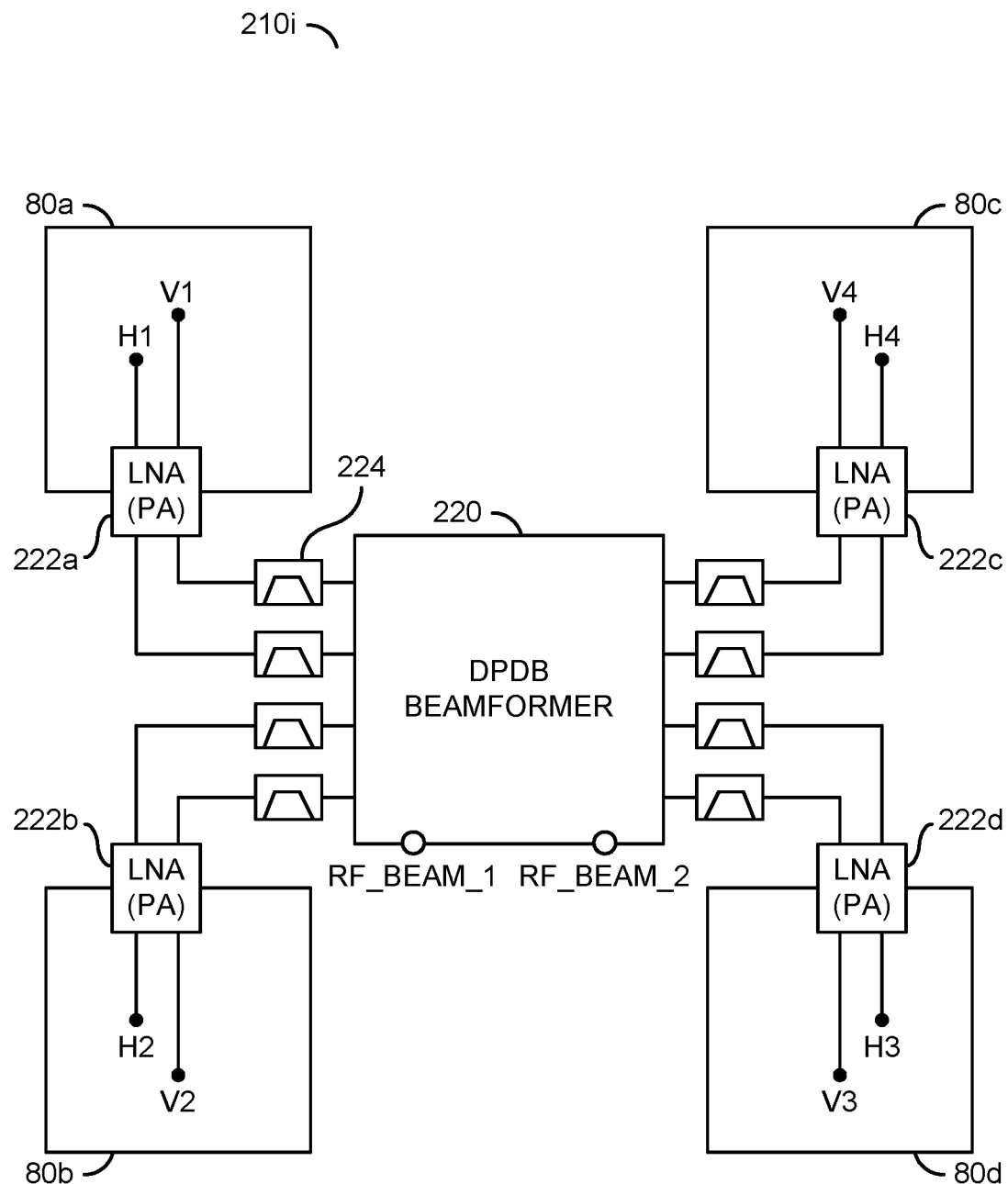
FIG. 5 is a diagram illustrating a beamformer circuit of a dual-polarization dual-beam phased array antenna panel in accordance with an example embodiment of the invention.

Referring to FIG. 5, a diagram is shown illustrating an example layout of the beamforming capable circuit 210i of FIG. 3 in accordance with an example embodiment of the invention. In an example, the beamforming capable circuit 210i may comprise a dual polarization dual-beam (DPDB) beamformer circuit 220, a number of amplifiers 222a-222d, and a number of neighboring antenna elements 80a-80d arranged in accordance with an embodiment of the invention. The beamforming capable circuit 210i may be representative of the beamforming capable circuits 210a-210p of FIG. 3. The dual polarization dual-beam (DPDB) beamformer circuit 220 is generally implemented as a packaged integrated circuit. The amplifiers 222a-222d are generally implemented as separately packaged integrated circuits. The amplifiers 222a-222d may comprise low noise amplifiers (LNAs) in receiver applications and power amplifiers (PAs) in transmitter applications. The amplifiers 222a-222d are generally implemented as separate integrated circuits from the beamformer circuit 220. The set of four antenna elements 80a-80d may be representative of a subset of antenna elements 80a-80n of the phased array antenna panel 200.

In an example, the antenna elements 80a-80n may be spaced apart from each other in both a horizontal direction and a vertical direction. In an example, the antenna elements 80a-80n may be separated by less than a half-wavelength (e.g., less than 5 millimeters (mm)). However, other spacings (e.g., 7 mm, ~13 mm, etc.) may be implemented accordingly to meet design criteria of a particular application. In various embodiments for a dual-polarization implementation, the packaged beamformer circuit 220 may have dimensions (e.g., 3.3 mm by 4.8 mm, etc.) allowing placement within the space between the adjacent antenna elements 80a-80d. Each beamformer circuit 210a-210p (e.g., 210i shown) may comprise a beamformer chip (or integrated circuit or module) 220 mounted on a substrate of the phased array antenna panel 200, at a center of a number of neighboring antenna elements 80a-80n (e.g., 80a-80d shown), and a number of separate (external) amplifiers (e.g., 222a-222d shown) mounted "on top" of respective antenna elements 80a-80n. Placing the amplifiers on top of the antennas allows for minimal loss between antenna feeds and the amplifiers, and also allows for an optional high-pass/band-pass filter (or filters) 224 to be placed between the amplifiers 222a-222d and the beamformer chip 220. In an example, the filters 224 may be implemented on printed circuit boards (PCBs) or with surface mount devices (SMDs). The placement of the separate external amplifiers 222a-222d on top of the antenna elements 80a-80d generally provides higher isolation between the common RF input/output ports B1 and B2 and the amplifier input/outputs of the beamformer circuit 220. The higher isolation generally results in lower root mean square (rms) gain and phase error, and lower system noise. The arrangement may be more desirable for lower frequency applications (e.g., Ku and CDL frequency bands).

Traces in a single conductive (e.g., metal) layer of the substrate may spatially route signals into alignment between the beamformer circuit 220, the amplifier circuits 222a-222d, and the antenna elements 80a-80d. For example, the single conductive layer may be the layer adjoining input/output pads of the beamformer circuit 220. The traces may remain in the single conductive layer until aligned with the input/output pads of the antenna elements 80a-80d. Through-substrate vias may provide connections from the traces to the antenna elements 80a-80d.

In some embodiments, each antenna element 80a-80n of the phased array antenna panel 200 may be connected to a corresponding amplifier circuit 222a-222d with two traces/through-substrate vias. In an example, the amplifier circuits 222a-222d may be mounted on a first surface (or side) of the phased array antenna panel 200 and the antenna elements 80a-80n may be located on a second surface (or side) or within a layer of the phased array antenna panel 200. The two traces/through-substrate vias may couple signals between the amplifier circuits 222a-222d and the antenna elements 80a-80n through intervening layers of the phased array antenna panel 200. One of the two traces/vias may convey a horizontally-polarized signal (e.g., H1-H4 shown). Another trace/via may convey a vertically-polarized signal (e.g., V1-V4 shown). Traces in the single conductive layer of the substrate may also directly connect the amplifier circuits 222a-222d to the beamformer circuits 220 and the beamformer circuits 220 to the combiner circuits 212a-212k and 214a-214k (see FIG. 3). In various embodiments, each beam former circuit 220 may be directly connected by two traces to two corresponding combiner circuits 212a-212k and 214a-214k. For example, a trace may carry the signal (e.g., RF_BEAM_1). Another trace may carry the signal (e.g., RF_BEAM_2). The traces may comprise a portion of the power of the signals RF_BEAM_1 and RF_BEAM_2, respectively, directed to the respective beamformer circuit 220. The compact layout generally allows higher power efficiency by minimizing RF losses. The overall loss optimization generally provides better thermal performance.

Implementing the VH-HV configuration generally minimizes the loss and possible crossovers. Having lower loss in the antenna interface may improve a receive gain and/or a transmit gain. The lower loss may improve a total gain budget multiple (e.g., 2) times, once on the receiving side and once on the transmitting side in configurations where two of the panels are used in a transmit-receive communication system. The lower loss may provide flexibility for the beamformer circuits 220 to utilize a lower output power that is saved from the connection. The lower output power generally means lower power consumption and better thermal consumption. Up to a few (e.g., 1-2) decibels improvement may result in a modest (e.g., 20-30%) power consumption improvement and a relative thermal performance improvement. The same may apply for the receive mode and lower power consumption to achieve relaxed 5G New Radio specification criteria.

Figure 6:
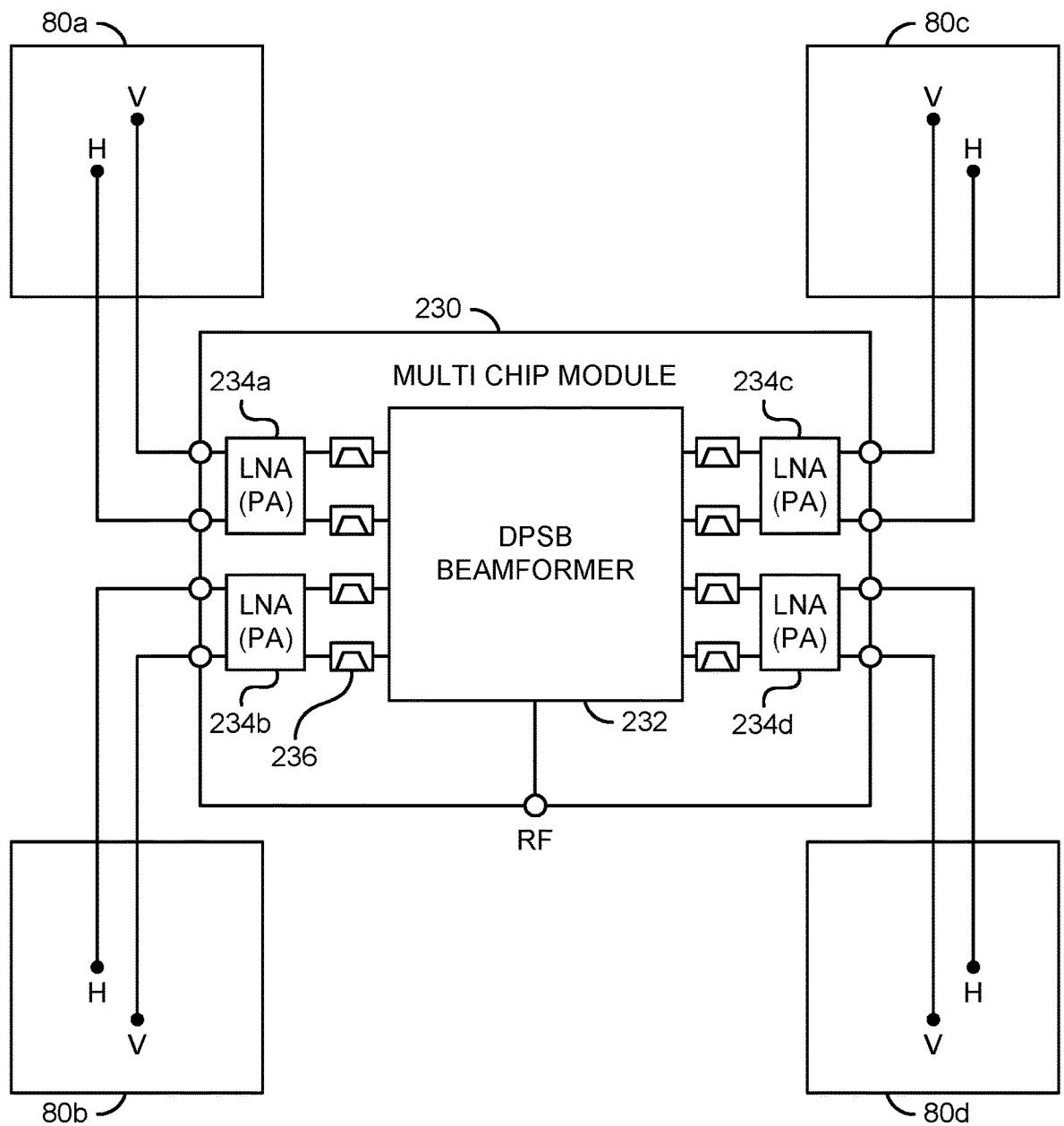
FIG. 6 is a diagram illustrating a beamformer circuit of a dual-polarization single-beam phased array antenna panel in accordance with another example embodiment of the invention.

Referring to FIG. 6, a diagram is shown illustrating an example layout of a beamformer module 230 in accordance with an example embodiment of the invention. In higher frequency applications, the same benefits described above in connection with FIGS. 4 and 5 may be achieved by integrating the separate beamformer chips and amplifier chips into a common package as a multi-chip-module. The beamformer module 230 and neighboring antenna elements (e.g., 80*a*-80*d*) arranged in accordance with an example embodiment of the invention may be used to implement the beamforming capable circuits 110*a*-110*p* of FIG. 2 or 210*a*-210*p* of FIG. 3. The beamformer module 230 may be packaged as a multi-chip-module (MCM) comprising a beamformer integrated circuit 232 and a number of amplifier (e.g., LNA or PA) integrated circuits 234*a*-234*d*. In some embodiments, the beamformer module 230 may further comprise a number of high-pass/band-pass filter circuits 236 coupled between the beamformer circuit 230 and respective amplifier circuits 234*a*-234*d*. The beamformer module 230 may be implemented for single-beam and dual-beam applications.

Figure 7:
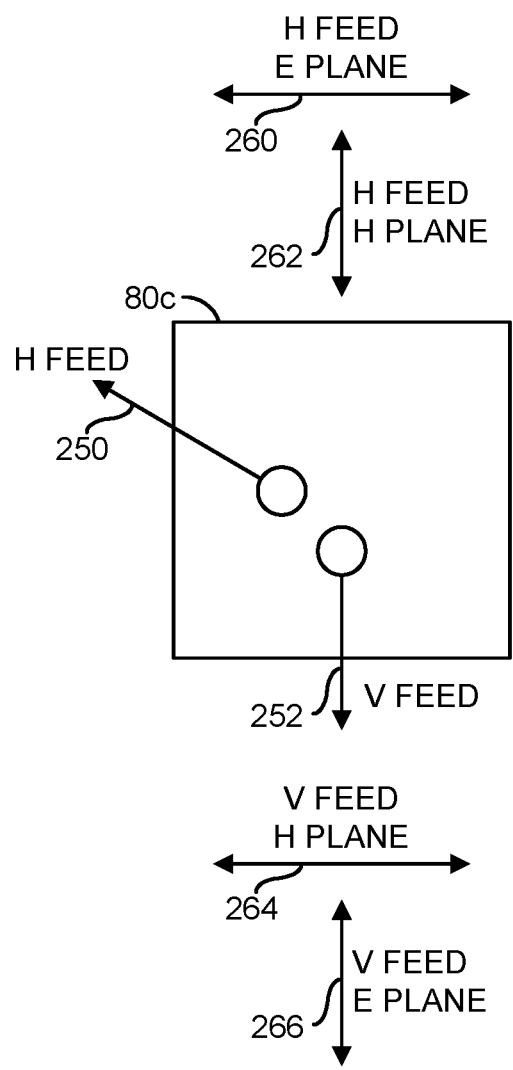
FIG. 7 is a layout diagram of a top side of an antenna element in accordance with an embodiment of the invention.

Referring to FIG. 7, a diagram of an example layout of a top side of an antenna element 80*c* is shown in accordance with an embodiment of the invention. The antenna element 80*c* generally comprises two feeds 250 and 252. The feed 250 may implement a horizontal feed. The horizontal feed 250 is generally coupled via an adjacent amplifier 122*a*-122*d* (or 222*a*-222*d*) to a horizontally-polarized port RFH1-RFH(N) of a neighboring beamformer circuit 120 or 220. The feed 252 may implement a vertical feed. The vertical feed 252 is generally coupled via the adjacent amplifier 122*a*-122*d* (or 222*a*-222*d*) to a vertically-polarized port RFV1-RFV(N) of a neighboring beamformer circuit 120 or 220.

The antenna element 80*c* may be sensitive along a horizontal electrical (E) plane 260 and a vertical magnetic (H) plane 262. The electrical plane 260 and the magnetic plane 262 may be coupled to the horizontal feed 250. The antenna element 80*c* may be sensitive along a horizontal magnetic (H) plane 264 and a vertical electric (E) plane 266. The magnetic plane 264 and the electric plane 266 may be coupled to the horizontal feed 252.

To minimize the coupling between the V-planes and the H-planes of each antenna element 80*a*-80*n*, the V-plane feed lines and the H-plane feed lines may be electrically and/or physically isolated. Any cross-overs and/or proximity between the lines may lower the isolation. Various embodiments of the invention may eliminate the cross-overs. Some embodiments may also maximize the distance between the feed lines. The isolation generally improves the unwanted coupling between the V-planes and the H-planes and minimizes the leakage of electromagnetic waves between the feeds.

Figure 8:
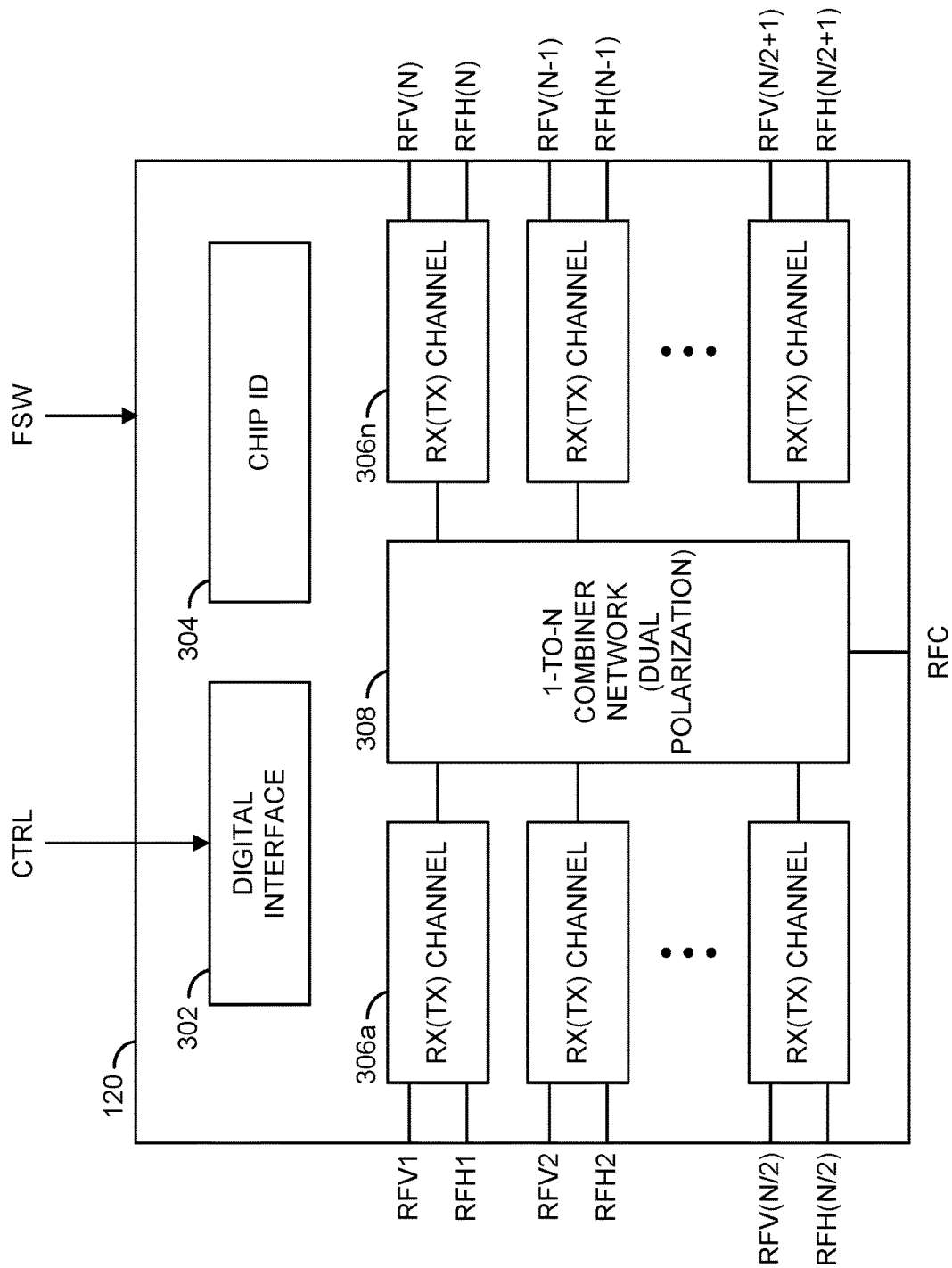
FIG. 8 is a diagram illustrating a generic dual-polarization single-beam beamformer circuit in accordance with an example embodiment of the invention.

Referring to FIG. 8, a diagram is shown illustrating an example implementation of a dual-polarization single-beam beamformer circuit 120 in accordance with an example embodiment of the invention. In an example, the dual-polarization single-beam beamformer circuit 120 may be representative of the dual-polarization single-beam beamformer circuits found in the beamforming capable circuits 110*a*-110*p* of FIG. 2. In an example, the dual-polarization single-beam beamformer circuit 120 may have a digital interface configured to receive the signal FSW and the signal(s) CTRL, a common RF input/output port (RFC), a number of vertical antenna input/output ports (RFV1-RFV(N)), and a number of horizontal antenna input/output ports (RFH1-RFH(N)). In general, any number (e.g., N) of vertical and horizontal antenna input/output ports (or channels) may be implemented accordingly to meet design criteria of a particular implementation.

In various embodiments, the vertical antenna input/output ports RFV1-RFV(N) may be coupled to corresponding vertical input/outputs of the respective antenna elements 80*a*-80*n* and the horizontal antenna input/output ports RFH1-RFH(N) may be coupled to corresponding horizontal input/outputs of the respective antenna elements 80*a*-80*n*. The dual-polarization single-beam beamformer circuit 120 generally implements a number (e.g., N) of channels corresponding to the number of pairs of vertical and horizontal antenna input/output ports (RFV1, RFH1), (RFV2, RFH2), (RFV(N), RFH(N)). The channels may be implemented as receiver (RX) channels, transmitter (TX) channels, or transceiver (TRX) channels. In various embodiments, each of the transceiver channels may comprise a respective transmit channel and a respective receive channel. The transceiver channels are generally configured to switch between transmitting or receiving based upon the signal FSW. The dual-polarization single-beam beamformer circuit 120 generally implements a transmit mode and/or a receive mode. In an example, a state of the signal FSW may determine whether the transmit mode or the receive mode is active. In the transmit mode, the dual-polarization single-beam beamformer circuit 120 is generally configured to receive radio frequency signals at the common input/output port RFC, and present radio frequency signals at the antenna input/output ports RFV1-RFV(N) and RFH1-RFH(N). The signals presented at each of the antenna input/output ports RFV1-RFV(N) and RFH1-RFH(N) are generated by the dual-polarization single-beam beamformer circuit 120 in response to the radio frequency signals received at the common input/output port RFC and a respective number of setting values (e.g., gain, phase, bias, etc.) corresponding to each of the antenna input/output ports RFV1-RFV(N) and RFH1-RFH(N).

In an example, the dual-polarization single-beam beamformer circuit 120 may comprise a block (or circuit) 302, a block (or circuit) 304, a number of blocks (circuits) 306*a*-306*n*, and a block (or circuit) 308. The circuit 302 may implement an interface circuit. In various embodiments, the circuit 302 may implement a digital interface. The circuit 308 may implement a 1-N combiner/splitter network. The circuits 306*a*-306*n* may implement receiver (RX) and/or transmitter (TX) channels. The circuit 304 may implement a hard-wired address (e.g., chip ID) for the single-beam beamformer circuit 120.

In an example, the signals FSW and CTRL are exchanged with the circuit 302. In an example, the circuit 302 may comprise a serial interface. The circuit 302 may be configured to be compliant with one or more serial interface standards including, but not limited to, serial peripheral interface (SPI), inter-integrated circuit (I²C), daisy chain, etc. In an example, the circuit 302 may be configured to allow programming and control of the dual-polarization single-beam beamformer circuit 120 using a serial communication link (or bus). In an example, the circuit 302 may be configured to program and control the circuits 306a-306n in response to the signals CTRL and FSW. In an example, the circuit 302 may control whether the circuits 306a-306n operate in a transmit mode or a receive mode in response to the signal FSW.

In an example, the circuit 302 may implement a 4-wire embedded SPI core. In an example, the circuit 302 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 302 may include a transmit/receive function switching pin that may receive the signal FSW. In an example, the signals MOSI, MISO, SCLK, and SS/CS may be configured to implement the 4-wire SPI protocol interface as summarized in the following TABLE 1:

TABLE 1

| SIGNAL | FUNCTION |
|--------|----------|
| MOSI   | Master out Slave in |
| MISO   | Master in Slave out |
| SCLK   | Serial clock |
| SS/CS  | Slave Select/Chip Select |

In an example, the circuit 304 may set a physical address of the dual-polarization single-beam beamformer circuit 120 based upon hardware coded address bits (or pins). In some embodiments, the hard-wired address bits may be hard coded within the chip implementing the single-beam beamformer 120 during manufacturing. In some embodiments, the hard-wired address bits may be programmable within the chip implementing the single-beam beamformer 120 during manufacturing. In some embodiments, the hard-wired address bits may be programmed using fuses, anti-fuses, or other conventional techniques.

Figure 9:
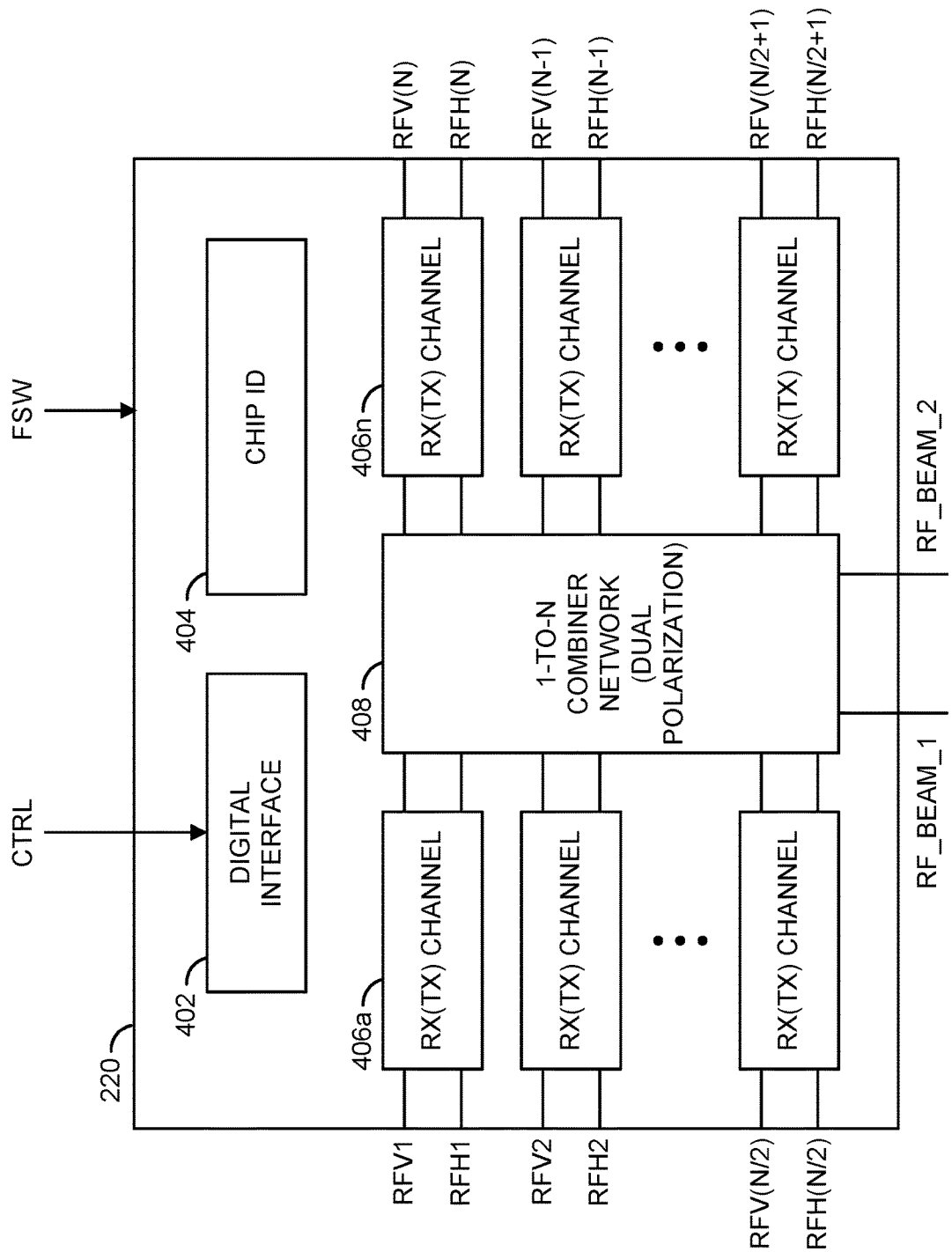
FIG. 9 is a diagram illustrating a generic dual-polarization dual-beam beamformer circuit in accordance with an example embodiment of the invention.

Referring to FIG. 9, a diagram is shown illustrating an example implementation of a dual-polarization dual-beam beam former circuit 220 in accordance with an example embodiment of the invention. In an example, the dual-polarization dual-beam beamformer circuit 220 may be representative of the dual-polarization dual-beam beamformer circuits implemented as part of the beamforming capable circuits 210a-210p of FIG. 3. In an example, the dual-polarization dual-beam beamformer circuit 220 may have a digital interface configured to receive the signal FSW and the signal(s) CTRL, a first common RF input/output port configured to receive/present a first RF beam signal (e.g., RF_BEAM_1), a second common RF input/output port configured to receive/present a second RF beam signal (e.g., RF_BEAM_2), a number of vertical antenna input/output ports configured to receive/present a first set of antenna signals (e.g., RFV1-RFV(N)), and a number of horizontal antenna input/output ports configured to receive/present a second set of antenna signals (e.g., RFH1-RFH(N)). In general, any number (e.g., N) of vertical and horizontal antenna input/output ports (or channels) may be implemented accordingly to meet design criteria of a particular implementation.

In various embodiments, the signal RF_BEAM_1 may be presented/received by the first common RF input/output port, the signal RF_BEAM_2 may be presented/received by the second common RF input/output port, the first set of antenna input/output signals RFV1-RFV(N) may be coupled from/to corresponding vertical input/outputs of the respective antenna elements 80a-80n, and the second set of antenna input/output signals RFH1-RFH(N) may be coupled from/to corresponding horizontal input/outputs of the respective antenna elements 80a-80n. The dual-polarization dual-beam beamformer circuit 220 generally implements a number (e.g., N) of channels corresponding to the number of pairs of vertical and horizontal antenna input/output ports (RFV1, RFH1), (RFV2, RFH2), . . . , (RFV(N), RFH(N)). The channels may be implemented as receiver (RX) channels, transmitter (TX) channels, or transceiver (TRX) channels. In various embodiments, each of the transceiver channels may comprise a respective transmit channel and a respective receive channel. The transceiver channels are generally configured to switch between transmitting or receiving based upon the signal FSW.

The dual-polarization dual-beam beamformer circuit 220 generally implements a transmit mode and/or a receive mode. In an example, a state of the signal FSW may determine whether the transmit mode or the receive mode is active. In the transmit mode, the dual-polarization dual-beam beamformer circuit 220 is generally configured to receive radio frequency signals at the common input/output ports (e.g., the signals RF_BEAM_1 and RF_BEAM_2), and present radio frequency signals (e.g., the signals RFV1-RFV(N) and RFH1-RFH(N)) at the antenna input/output ports. The signals RFV1-RFV(N) and RFH1-RFH(N) presented at each of the antenna input/output ports are generated by the dual-polarization dual-beam beamformer circuit 220 in response to the radio frequency signals RF_BEAM_1 and RF_BEAM_2 received at the common input/output ports and a respective number of setting values (e.g., gain, phase, bias, etc.) corresponding to each of the antenna input/output ports.

In an example, the dual-polarization dual-beam beamformer circuit 220 may comprise a block (or circuit) 402, a block (or circuit) 404, a number of blocks (circuits) 406a-406n, and a block (or circuit) 408. The circuit 402 may implement an interface circuit. In various embodiments, the circuit 402 may implement a digital interface. The circuit 408 may implement a 1-N dual-channel combiner/splitter network. The circuits 406a-406n may implement receiver (RX) or transmitter (TX) channels. The circuit 402 may implement a hard-wired address (e.g., chip ID) for the beam former circuit 220.

In an example, the signals FSW and CTRL are exchanged with the circuit 402. In an example, the circuit 402 may comprise a serial interface. The circuit 402 may be configured to be compliant with one or more serial interface standards including, but not limited to, serial peripheral interface (SPI), inter-integrated circuit (I²C), daisy chain, etc. In an example, the circuit 402 may be configured to allow programming and control of the dual-polarization dual-beam beamformer circuit 220 using a serial communication link (or bus). In an example, the circuit 402 may be configured to program and control the circuits 154*a*-154*n* in response to the signals CTRL and FSW. In an example, the circuit 402 may control whether the circuits 406*a*-406*n* operate in a transmit mode or a receive mode in response to the signal FSW.

In an example, the circuit 402 may implement a 4-wire embedded SPI core. In an example, the circuit 402 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 402 may include a transmit/receive function switching pin that may receive the signal FSW. In an example, the signals MOSI, MISO, SCLK, and SS/CS may be configured to implement the 4-wire SPI protocol interface as summarized in the following TABLE 2:

TABLE 2

| SIGNAL | FUNCTION |
| --- | --- |
| MOSI | Master out Slave in |
| MISO | Master in Slave out |
| SCLK | Serial clock |
| SS/CS | Slave Select/Chip Select |

In an example, the circuit 404 may set a physical address of the dual-polarization beam former circuit 220 based upon hardware coded address bits (or pins). In some embodiments, the hard-wired address bits may be hard coded within the chip implementing the beam former 220 during manufacturing. In some embodiments, the hard-wired address bits may be programmable within the chip implementing the beam former 220 during manufacturing. In some embodiments, the hard-wired address bits may be programmed using fuses, anti-fuses, or other conventional techniques.

Figure 10:
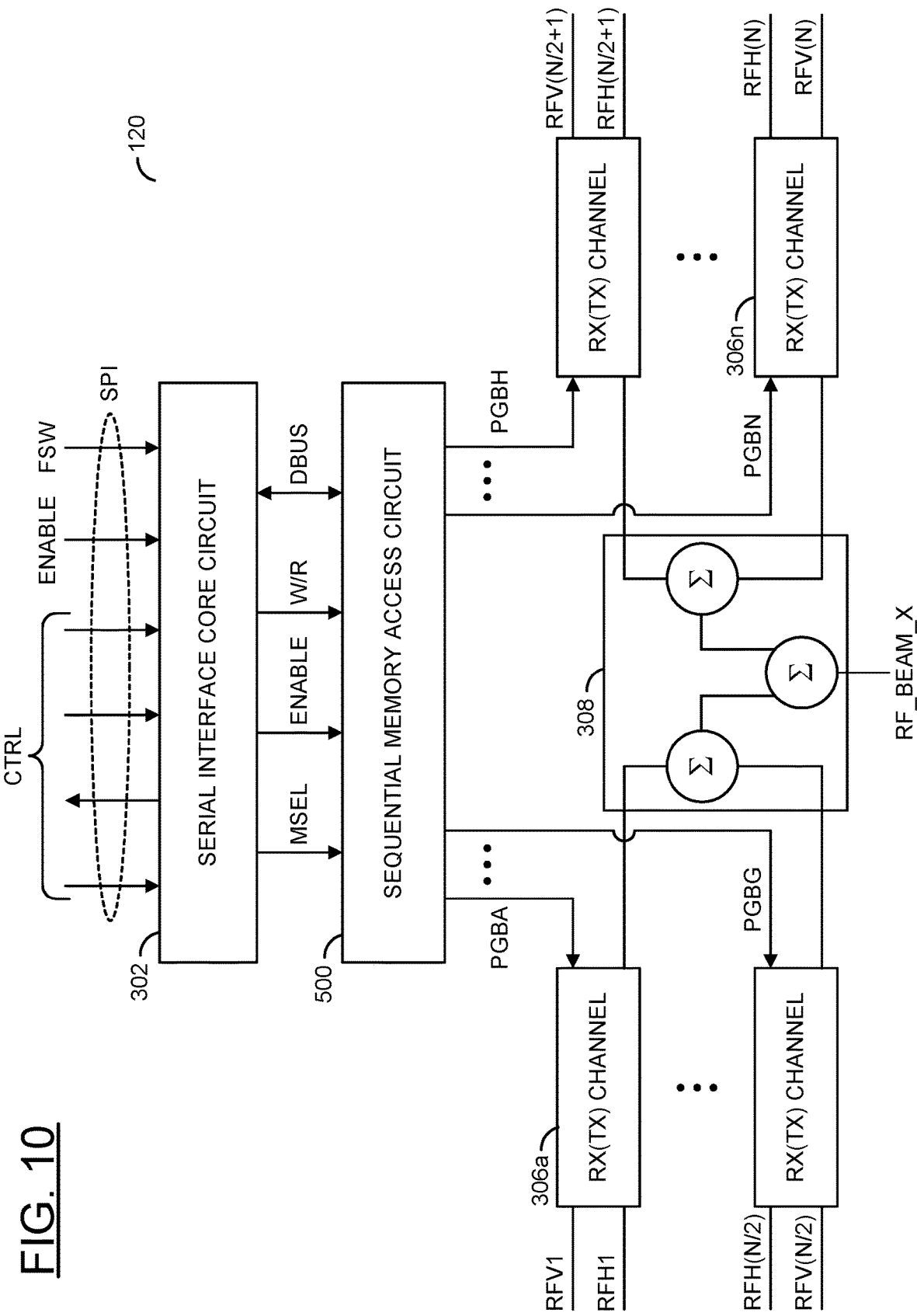
FIG. 10 is a diagram illustrating a fast memory access scheme for phase and gain control.

Referring to FIG. 10, a block diagram of an example implementation of a fast memory access architecture in accordance with an embodiment of the invention is shown. In an example, the beamformer circuit 120 generally comprises the digital interface circuit 302, the transceiver circuits 306*a*-306*n*, the combiner/splitter circuit 308, and a block (or circuit) 500. The circuit 500 may be implemented with hardware, a combination of hardware and software and/or simulated with software. The beamformer circuit 220 of FIG. 9 may be implemented similarly.

A signal SPI may comprise multiple signals (e.g., CTRL, ENABLE, and FSW). The signals CTRL may comprise a number of serial bus signals used to convey data and commands between the controller 68 and the beam former circuit 120. The signal ENABLE may be received by the circuit 302 and transferred to the circuit 500. The signal ENABLE may be an enable signal synchronized to a clock signal received as part of the signals CTRL. The circuit 302 may receive the signal FSW. The signal FSW may be a hard-wired fast T/R switch signal used to switch the beam former circuit 120 between the transmit mode and the receive mode.

A signal (e.g., MSEL) may be generated by the circuit 302 and received by the circuit 500. The signal MSEL may be a mode select signal that alternately enables and disables a fast phase/gain switching function of the beam former 120. The signal ENABLE may be transferred from the controller 68 through the circuit 302 to the circuit 500. The circuit 302 may generate a signal (e.g., W/R) received by the circuit 500. The signal W/R may be a write/read signal. While in a write state, the signal W/R may indicate a write of gain values, phase values and/or bias values into buffers within the circuit 500. While in a read state, the signal W/R may indicate a read of the gain values, the phase values and/or the bias values from the circuit 500. A signal (e.g., DBUS) may be exchanged between the circuit 302 and the circuit 500. The signal DBUS may be a bidirectional data bus signal used to transfer the various values between the circuits 302 and 500 along a local data bus. Multiple signals (e.g., PGBA to PGBN) may be generated by the circuit 500 and transferred to the transceiver channel circuits 306*a*-306*n*, respectively. Each signal PGBA to PGBN may carry a current phase value (P), a current gain value (G) and a current bias value (B) to be used by the corresponding transceiver channel circuits 306*a*-306*n*.

The circuit 302 may implement a serial protocol interface (SPI) core circuit. When implemented as a SPI core, the circuit 302 may be operational to provide communications between the beam former circuit 120 and the controller 68 via the signals CTRL, ENABLE, and FSW. In various embodiments, the circuit 302 may control the setting values (e.g., the gain values and the phase values) and/or the bias values buffered in the circuit 500. The setting values may provide several tens (e.g., 35) of decibels (dB) of gain control for the fields 102*a*-102*n* and/or 104*a*-104*n*. The setting values may also provide multiple bits (e.g., 5 bits) of phase control for the field 102*a*-102*n* and/or 104*a*-104*n*. Other gain ranges and/or phase ranges may be implemented to meet the design criteria of a particular application. Loading of the setting values into the buffers within the circuit 500 is generally controlled by the mode select signal MSEL and the enable signal ENABLE. A topology of the system 80 generally utilizes a single pad for the signal ENABLE at the circuit 302 to control sequential access to the register layers. The single pad approach generally reduces a number of pads compared with common multi-pad designs that implement random access addressing for the registers.

The circuit 302 may also be operational to control the transmit/receive mode of the transceiver circuits 306*a*-306*n* using the fast switching signal FSW. A switching speed from the transmit mode to the receive mode may be fast (e.g., less than or equal to about 30 nanoseconds). A switching speed from the receive mode to the transmit mode may be similarly fast (e.g., less than or equal to about 130 nanoseconds). The fast switching signal FSW may be toggled between the transmit mode and the receive mode at a high frequency (e.g., at least 10 megahertz). Other frequencies of the fast switching signal FSW may be implemented to meet the design criteria of a particular application.

The circuit 500 may implement a sequential memory access circuit (or access circuit for short). The circuit 500 is generally operational to buffer multiple subsets (or layers) of the gain values, the phase values and the bias values for each of the transceiver channel circuits 306*a*-306*n*. In various embodiments, the number of subsets may be an integer N (e.g., 4, 32, 128, etc.) to provide fast beam redirecting to N remote devices in short order. Other numbers of subsets may be implemented to meet the design criteria of a particular application.

While the mode select signal MSEL is in the enable state, when the signal ENABLE changes from a hold state (or mode) to a transfer state (or mode), the circuit 500 may be operational to switch to a next subset of the gain values and the phase values thereby causing the field 102*a*-102*n* and/or 104*a*-104*n* to be directed among different remote devices.

The switching of the subsets may be triggered by an edge in the signal ENABLE transitioning to the transfer state, or a level of the signal ENABLE being in the transfer state.

Each load operation of a new subset of the gain values and the phase values into the transceiver channel circuits 306a-306n generally causes the fields 102a-102n and/or 104a-104n to adjust to a new location. The new subset may also cause adjustments of the beam geometry. The adjustments are generally achieved within a short period (e.g., under 30 nanoseconds) to meet a low-latency criterion. Once the current fields 102a-102n and/or 104a-104n have been adjusted, the RF transceiver system 80 may communicate bidirectionally with one or more remote wireless devices generally aligned with at least one lobe in the fields 102a-102n and/or 104a-104n. The communication is typically achieved during a burst lasting a specified dwell period (e.g., approximately one microsecond). After the dwell period has ended, a next subset of the gain values and the phase values may be loaded into the transceiver channel circuits 306a-306n to cause more adjustments of the beam location and/or geometry. The next beam location and/or geometry may be suitable for bidirectional communications with a next remote wireless device. Afterwards, the RF transceiver system 80 may communicate bidirectionally with the next remote wireless device or devices for another predetermined dwell period. Other switching speeds and/or lengths of the predetermined period may be implemented to meet the design criteria of a particular application.

While the mode select signal MSEL is in the disable state, the access circuit 500 may configure a first of multiple register control signals to follow the signal ENABLE. The other register control signals may be deasserted. The pulses in the first register control signal that follow the pulses in the signal ENABLE may be used by a first register layer of the access circuit 500 to load the gain values, the phase values and/or the bias values presented by the circuit 302. In both single-polarization and dual-polarization embodiments, the circuit 500 may be implemented similarly to circuits described in co-owned U.S. patent application Ser. No. 15/817,909, filed Nov. 20, 2017, which is hereby incorporated by reference in its entirety.

Figure 11:
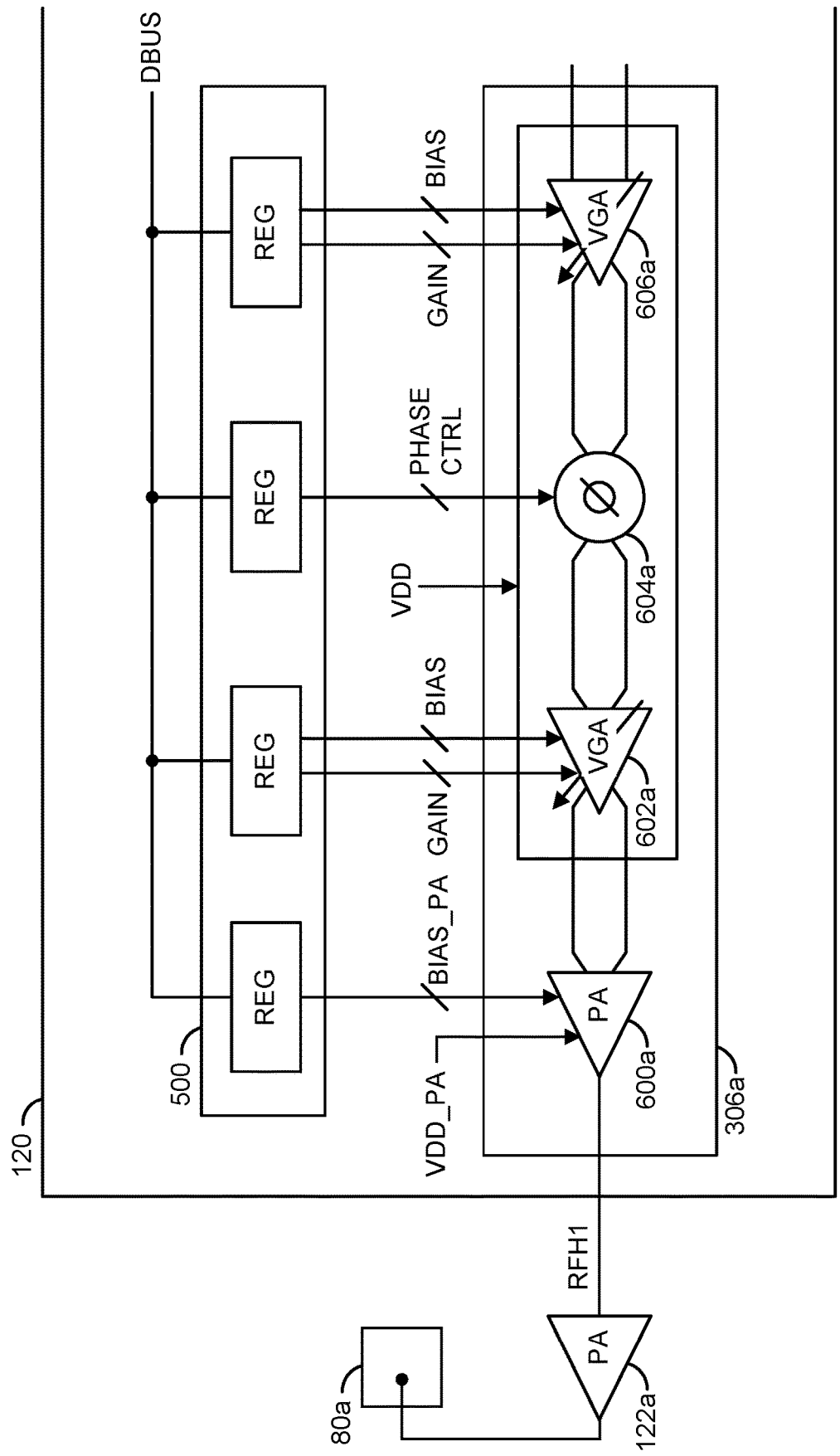
FIG. 11 is a diagram illustrating an example implementation of a transmit (TX) channel portion of the dual-polarization single-beam beamformer circuit of FIG. 8.

Referring to FIG. 11, a diagram illustrating an example implementation of a transmit (TX) channel portion of the dual-polarization single-beam beamformer circuit 120 of FIG. 8 is shown. In various embodiments, each channel may have independent phase, bias, and gain controls in each stage. The independent phase, bias, and gain controls generally provide for lowering the power consumption without lowering the gain. In various embodiments, the stages may comprise separate reference current weighting structures that may be programmed separately via the serial interface 302. In both single-polarization and dual-polarization embodiments, the bias and gain controls may be implemented similarly to circuits described in co-owned U.S. patent application Ser. No. 16/132,877, filed Sep. 17, 2018, which is hereby incorporated by reference in its entirety.

In an example, the transmit channel portion of the channel circuit 306a may comprise an output (or power) amplifier (PA) stage 602a, a variable gain amplifier (VGA) stage 602a, a variable phase shift stage 604a, and an input amplifier stage 606a. The input amplifier stage 606a may also be implemented as a variable gain amplifier (VGA). In various embodiments, the stages of channel circuit 306a may receive a first supply voltage (e.g., VDD). In some embodiments, the stages of channel circuit 306a other than the power amplifier stage 602a may receive the first supply voltage VDD, while the power amplifier stage 600a may receive a second, separate supply voltage (e.g., VDD_PA). In an example, a separate supply pin for receiving the supply voltage VDD_PA generally provides flexibility to change the supply voltage of the PA stage 600a for improved efficiency and/or to match the output of the amplifier 600a to the corresponding external amplifier 122a. In an example, when the target output power is lowered, the supply voltage VDD_PA may also be lowered. In an example, each stage of the circuit 306a may have a respective register or registers (e.g., implemented as part of the circuit 500) in which respective bias, phase, and/or gain values may be programmed. The transmit channels of each of the channel circuits 306b-306n may be implemented similarly.

Figure 12:
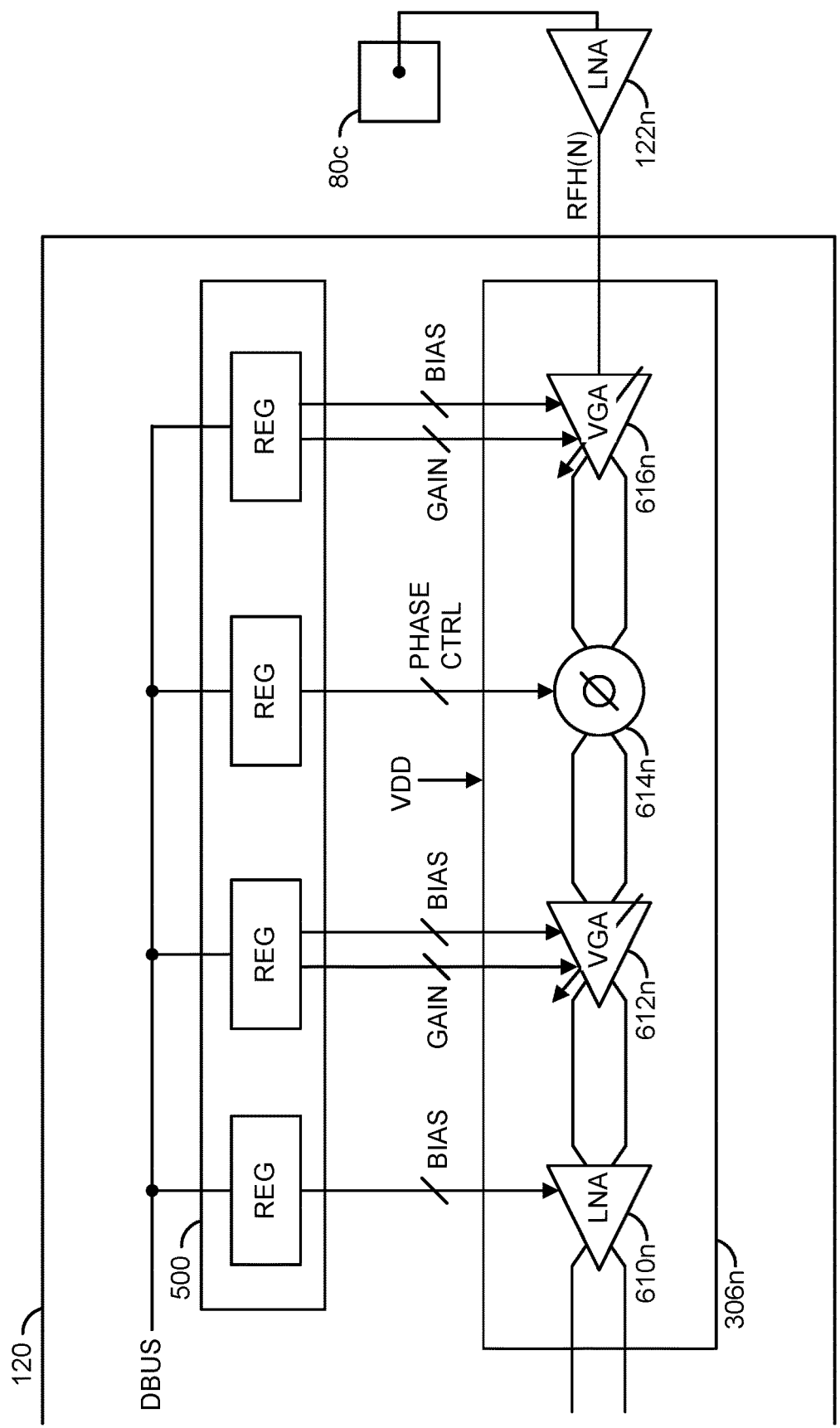
FIG. 12 is a diagram illustrating an example implementation of a receive (RX) channel portion of the dual-polarization single-beam beamformer circuit of FIG. 8.

Referring to FIG. 12, a diagram illustrating an example implementation of a receive (RX) channel portion of the dual-polarization single-beam beamformer circuit 120 of FIG. 8 is shown. In various embodiments implementing receive channels, each receive channel may have independent phase, bias, and gain controls in each stage. The independent phase, bias, and gain controls generally provide for lowering the power consumption without lowering the gain. In various embodiments, the stages may comprise separate reference current weighting structures that may be programmed separately via the serial interface 302. In an example, the receive channel portion of the channel circuit 306n may comprise a low noise amplifier (LNA) stage 610a, a variable gain amplifier (VGA) stage 612a, a variable phase shift stage 614a, and an input amplifier stage 616a. The input amplifier stage 616a may be implemented as a low noise amplifier (LNA). The input amplifier stage 616a may also be implemented as a variable gain amplifier (VGA). An output of the corresponding external amplifier 122n may be received at an input of the input amplifier 616n. In various embodiments, the stages of channel circuit 306n may receive a supply voltage (e.g., VDD). In an example, each stage of the channel circuit 306n may have a respective register or registers (e.g., implemented as part of the circuit 500) in which respective bias, phase, and/or gain values may be programmed. Each of the receive channel circuits 306a-306(n−1) may be implemented similarly.

Although embodiments of the invention have been described in the context of a fifth-generation (5G) application (e.g., 28 GHz and 39 GHz 5GmmW, etc.), the present invention is not limited to 5G applications, but may also be applied in other high data rate wireless and wired communications applications where different rapid switching, multiple channel, and multiple user issues may exist. The present invention addresses concerns related to high speed wireless communications, mobile and stationary transceivers and point-to-point links. Future generations of wireless communications applications using radio-frequency (RF), microwave, and millimeter-wave links can be expected to provide increasing speed, increasing flexibility, and increasing numbers of interconnections and layers. The present invention may also be applicable to wireless communications systems implemented in compliance with either existing (legacy, 2G, 3G, 4G) specifications or future specifications.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a phased array antenna panel comprising a substrate and a plurality of antenna elements disposed in a first surface of said substrate;
    a plurality of amplifier circuits, wherein (i) each of said amplifier circuits is mounted on a second surface of said substrate of said phased array antenna panel adjacent to a respective one of said plurality of antenna elements and (ii) each of said amplifier circuits has one or more first ports directly coupled to the respective antenna element by one or more through-substrate vias through one or more intervening layers of said substrate; and
    a plurality of beamformer circuits, wherein (i) each of said beamformer circuits is mounted on said second surface of said substrate of said phased array antenna panel adjacent to a number of said amplifier circuits, (ii) each of said beamformer circuits has one or more second ports directly coupled to each of the adjacent amplifier circuits, and (iii) each of said beamformer circuits is configured to exchange a plurality of radio-frequency signals with each of the adjacent amplifier circuits via said second ports.

2. The apparatus according to claim 1, wherein said amplifier circuits comprise low noise amplifiers configured to receive a plurality of radio-frequency input signals at said first ports while said phased array antenna panel is in a receive mode.

3. The apparatus according to claim 1, wherein said amplifier circuits comprise power amplifiers configured to generate a plurality of radio-frequency output signals at said first ports while said phased array antenna panel is in a transmit mode.

4. The apparatus according to claim 1, further comprising:
    a plurality of filter circuits, each coupled between a respective amplifier circuit and a respective one of said second ports of said beamformer circuits.

5. The apparatus according to claim 1, wherein said amplifier circuits and said beamformer circuits are each implemented as a separate integrated circuit.

6. The apparatus according to claim 1, wherein each of said beamformer circuits and the number of adjacent amplifier circuits are implemented as a multi-chip module.

7. The apparatus according to claim 1, wherein each of said antenna elements comprises a dual-polarization antenna element.

8. The apparatus according to claim 7, wherein said dual-polarization antenna element has a vertical feed and a horizontal feed connected to said first ports of the adjacent amplifier circuit.

9. The apparatus according to claim 1, wherein each of said beamformer circuits comprises a dual-polarization single-beam beamformer circuit or a dual-polarization dual-beam beamformer circuit.

10. The apparatus according to claim 1, wherein said apparatus is part of a satellite communication system.

11. The apparatus according to claim 1, wherein said apparatus is part of a wireless communication system.

12. The apparatus according to claim 1, wherein said apparatus is part of a fifth generation (5G) millimeter wave (mmW) communication system.

13. A method of communicating with a phased array antenna panel comprising:
    mounting a plurality of amplifier circuits on a first surface of a substrate of said phased array antenna panel adjacent to a plurality of antenna elements, wherein said antenna elements are disposed on a second surface of said substrate;
    coupling one or more radio frequency input/output ports of each amplifier circuit to a respective antenna element adjacent to each amplifier circuit using one or more through-substrate vias through one or more intervening layers of said substrate;
    mounting a plurality of beamformer circuits on said first surface of said substrate of said phased array antenna panel, each adjacent to a number of said amplifier circuits; and
    coupling one or more radio frequency input/output ports of each beamformer circuit to the number of adjacent amplifier circuits.

14. The method according to claim 13, further comprising:
    coupling each of said plurality of beamformer circuits to a controller via a serial bus.

15. The method according to claim 13, further comprising:
    receiving a plurality of radio-frequency input signals at said input/output ports of said amplifier circuits when operating in a receive mode.

16. The method according to claim 13, further comprising coupling a number of filter circuits between each of said beamformer circuits and the number of adjacent amplifier circuits.

17. The method according to claim 16, wherein said number of filter circuits comprise one or more of a high pass filter and a band pass filter.

18. The method according to claim 13, wherein said amplifier circuits comprise low noise amplifiers configured to receive a plurality of radio-frequency input signals at said radio frequency input/output ports while said phased array antenna panel is in a receive mode.

19. The method according to claim 13, wherein said amplifier circuits comprise power amplifiers configured to generate a plurality of radio-frequency output signals at said radio frequency input/output ports while said phased array antenna panel is in a transmit mode.

20. The method according to claim 13, further comprising integrating each beamformer circuit and said number of adjacent amplifier circuits in a multi-chip module prior to being mounted on said phased array antenna panel.

* * * * *